United States Patent
Shenbagam et al.

(10) Patent No.: US 7,900,208 B2
(45) Date of Patent: Mar. 1, 2011

(54) UNIFORM FRAMEWORK FOR STANDARDIZATION AND TRANSMISSION OF DOCUMENTS ELECTRONICALLY

(75) Inventors: Sundararaman Shenbagam, Fremont, CA (US); Shente Hong, Foster City, CA (US); Eng Keat Khor, Redwood City, CA (US); Sankar Mani, Foster City, CA (US); Krishnaprem Bhatia, Foster City, CA (US); Janaki Krishanswamy, Fremont, CA (US); Jagadish Changavi, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1324 days.

(21) Appl. No.: 11/291,186

(22) Filed: Nov. 30, 2005

(65) Prior Publication Data

US 2007/0136349 A1    Jun. 14, 2007

(51) Int. Cl.
G06F 3/00 (2006.01)
G06F 9/44 (2006.01)
G06F 9/46 (2006.01)
G06F 13/00 (2006.01)

(52) U.S. Cl. ...................................................... 719/313
(58) Field of Classification Search .................. 719/313
See application file for complete search history.

(56) References Cited

U.S. PATENT DOCUMENTS

| | | | |
|---|---|---|---|
| 5,644,778 A * | 7/1997 | Burks et al. ........................ | 705/2 |
| 6,230,201 B1 * | 5/2001 | Guck et al. ..................... | 709/228 |
| 7,028,312 B1 * | 4/2006 | Merrick et al. ................ | 719/330 |
| 7,130,898 B2 * | 10/2006 | Carter ........................... | 709/223 |
| 7,475,402 B1 * | 1/2009 | Carr ............................. | 719/313 |
| 7,788,338 B2 * | 8/2010 | Savchenko et al. ............ | 709/218 |
| 2006/0271939 A1 * | 11/2006 | Joris et al. ...................... | 719/313 |

* cited by examiner

Primary Examiner — Li B Zhen
Assistant Examiner — KimbleAnn Verdi
(74) Attorney, Agent, or Firm — Kilpatrick, Townsend & Stockton (57) ABSTRACT

A system for generating outgoing and translating incoming messages, comprising a core engine and a plurality of plug-ins; outgoing system further comprising a trading partner agreement database (TPAD). For the outgoing message, the TPAD identifies a particular extensible document format protocol plug-in and a particular extensible exchange protocol plug-in from plurality of plug-ins based on the parties' agreement. The core engine translates and constructs the message by encoding it with the identified plug-ins respectively. For the incoming message, the core engine examines every extensible exchange protocol, identifies the particular extensible exchange protocol, and decodes the incoming message with the identified exchange protocol. The core engine then examines every extensible document format protocol, identifies the particular extensible document format protocol, and processes the decoded message with the identified document protocol. Plurality document and exchange plug-ins allow the user to mix and match different protocol standards, making the system more flexible.

22 Claims, 8 Drawing Sheets

UNIFORM FRAMEWORK FOR STANDARDIZATION AND TRANSMISSION OF DOCUMENTS ELECTRONICALLY

TECHNICAL FIELD

The present invention relates to the field of electronic transmission. More particularly, embodiments of the present invention relate to standardization and transmission of documents that may be used in electronic-commerce.

BACKGROUND ART

Electronic-commerce began before personal computers were prevalent and has now grown into a multi-billion dollar industry. "E-commerce" is a term used to describe the activity of doing business on the Internet and it includes business-to-business, business-to-consumer, and consumer-to-consumer transactions that involves the sale of goods and services.

Business-to-business transactions (documents) are now common among many companies that accomplish business-to-business transactions through Electronic Data Interchange (EDI). In order to communicate, however, documents must be structured and understood by the parties to the transaction. For instance, there are many different structures such as a billing structure, a purchase order structure, a status order structure and many more that must be understood by the parties to the transaction.

As e-commerce evolved, different industries adopted different structures and standards. For example, the health care industry that may communicate with a pharmaceutical industry regarding a patient through the Internet has adopted a document standard called HL7. In comparison, the pharmaceutical industry has adopted a different document standard. As a result of adoption of different standards by different industries, business-to-business transactions cannot be fully automated and the document standard by one industry is not understood by another industry. Other examples include sharing documents electronically between laboratories and insurance companies, or when the passport office communicates with another department in order to obtain electronic information about a birth certificate of an individual. There are a number of different document standards used by different industries including EDI, EDI X12, EDI EDIFECS, HL7 and many more. A problem exists because numerous industries use e-commerce and numerous different standards are now available.

Even if documents are standardized, security and reliability of documents being transmitted is a concern given privacy issues and the importance of information being transmitted such as financial information. There are three factors associated with security and reliability. First, the message must be authenticated to ensure that a non-party to the transaction has not altered the message or the document being transmitted. Second, there must be a guarantee that the document or message has been delivered. Finally, the communicated document or message must be kept confidential between the parties to the transaction. Some of the exchange standards currently used to transmit documents include AS2, eb XML, and RNIF.

As the number of document standards and exchange standards for transmitting documents securely and reliably grows, messages combine different document standards with different exchange standards. The need to mix and match various standards depends on the particular needs of the parties to the transaction. Consequently, as number of document standards and number of exchange standards increases, the need to mix and match these standards increases as well in order to provide the parties with the flexibility to choose various standards according to their particular needs.

SUMMARY

Accordingly, there is a need to standardize documents in order for the document to be understood by the parties to the transaction. As such, there is a need for a system to be able to recognize and process messages that are encoded using different document protocols, e.g., by use of a plurality of extensible document format protocol plug-ins. Furthermore, there is a need to transmit the standardized document over the Internet securely and reliably. As such, there is a need for a system that can recognize and transmit messages that may be encoded in different exchange protocols, e.g., using a plurality of extensible exchange protocol plug-ins. Finally there is a need to allow the parties to mix and match different document protocols with different exchange protocols in order to provide them with the flexibility to choose various standards according to their particular needs. Embodiments of the present invention provide these advantages and others described below.

In one embodiment of the present invention for generating an outgoing message, the system includes a trading partner agreement database, a core engine, a plurality of extensible document format protocol plug-ins, and a plurality of extensible exchange protocol plug-ins. The trading partner agreement database determines an agreement between the parties to a transaction. The trading partner agreement database indicates a document format protocol from among a plurality of extensible document format protocol plug-ins that is agreed upon by the parties. Similarly, the trading partner agreement database indicates an exchange protocol from among a plurality of extensible exchange protocol plug-ins that is agreed upon by the parties. The core engine translates the document to be sent from a native format by encoding it with the particular extensible document format protocol plug-in and constructs the outgoing message by encoding it with the particular extensible exchange protocol plug-in.

As a result, a plurality of extensible document format protocol plug-ins and a plurality of extensible exchange protocol plug-ins are used to separately encode the document to be sent thereby providing the parties with the flexibility to pick and choose various document protocol standards with various exchange standards. This allows the user to mix and match different document standards with different exchange standards. The core engine may also include a validation and a batching block for validating and batching the outgoing message. It is appreciated that an interface block between the core engine and the extensible plug-ins allows additional plug-ins to be added as new protocols are required.

More specifically, an embodiment of the present invention pertains to a system for generating an outgoing message, the system comprising: a plurality of extensible document format protocols; a plurality of extensible exchange protocols; a database for identifying, based on sender and receiver identifications of a message, a particular extensible document format protocol of the plurality of extensible document format protocols and for identifying a particular extensible exchange protocol of the plurality of extensible exchange protocols; and a core engine comprising: a translator for translating the message based on the particular extensible document format protocol wherein the message is translated from a native format to produce a translated message; and a constructor for constructing the outgoing message based on the translated message, the outgoing message constructed based on the particular extensible exchange protocol.

Embodiments include the above and wherein the core engine further comprises a validation block coupled to the translator and coupled to the constructor, wherein the validation block validates the translated message for allowable field values and mandatory fields. Embodiments further include the above and wherein the translator is operable to perform message batching.

Embodiments further include a system for translating a received message, the system comprising: a plurality of extensible exchange protocols for identifying and decoding an exchange protocol of the received message; a plurality of extensible document format protocols for identifying and processing a document format protocol associated with the received message; a standard communication interface coupled to communicate with the plurality of extensible exchange protocols and extensible document format protocols; and a core engine coupled to the standard communication interface, the core engine for decoding and processing the received message to produce a message of a native format and wherein the core engine decodes and processes the received message based on a particular extensible exchange protocol and a particular extensible document format protocol, respectively.

Embodiments include the above and wherein the core engine comprises: a validation block for validating the decoded message, based on the particular extensible document format protocol, to produce a validated message; and a translation block coupled to the validation block for translating the validated message, based on the particular extensible document format protocol, into the message of the native format.

Embodiments further include a method for constructing an outgoing message, comprising: receiving an identity of a sender and an identity of a receiver of a message to be sent; identifying a particular extensible document format protocol associated with the message to be sent based on an agreement between the sender and the receiver, the particular extensible document format protocol being one of a plurality of extensible document format protocols; identifying a particular exchange protocol associated with the outgoing message based on the agreement between the sender and the receiver the particular extensible exchange protocol being one of a plurality of extensible exchange protocols; and encoding the message to be sent with the extensible document format protocol and the extensible exchange protocol respectively to produce the outgoing message.

Embodiments further include a method for translating an incoming message into a native format, comprising: examining the incoming message using a plurality of extensible exchange protocols to determine one extensible exchange protocol associated with the incoming message; examining the incoming message using a plurality of extensible document format protocols to determine one extensible document format protocol associated with the incoming message; decoding the incoming message with the one extensible exchange protocol to produce a decoded message; and processing the decoded message with the one extensible document format protocol to produce an output message of the native format.

The embodiments include the above and wherein the processing further comprises: validating the decoded message to produce a validated message; and translating the validated message into the native format.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Figure 1:
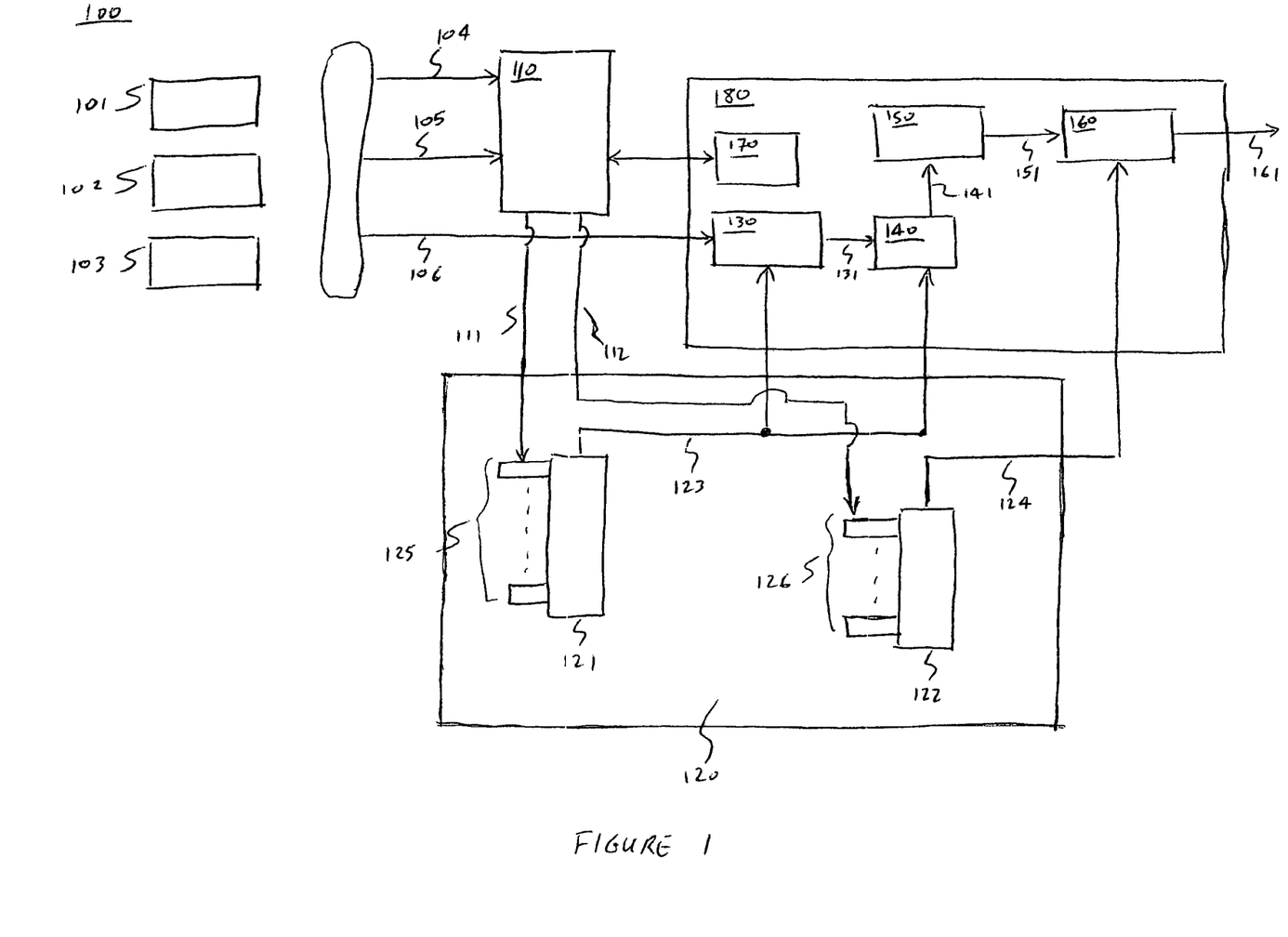
FIG. 1 shows one system embodiment of the present invention for generating an outgoing message.

Referring now to FIG. 1, an overview diagram of system 100 for generating an outgoing message in accordance with one embodiment of the present invention is shown. System 100 may be implemented in software, in one embodiment, system 100 and its core engine 180 receive a number of applications, for example applications 101, 102, and 103, in their native format such as the extensible markup language (XML). Among the applications received, the core engine 180 receives a document 106 to be sent in its native format and generates an outgoing message 161 using a particular document format protocol plug-in and a particular exchange protocol plug-in as shown in step 201 in a flow diagram of FIG. 2A for generating an outgoing message. Determination of a particular document format protocol plug-in and a particular exchange protocol plug-in is based on an agreement between the parties to the transaction. The received document may be originated by applications 101-103.

Referring still to system 100 of FIG. 1, a trading partner agreement database 110 for storing a plurality of trading partner agreements between senders and receivers is shown. For each stored agreement, the database 110 includes an identification of an exchange and document protocol used for messages between the parties. The trading partner agreement database 110 is coupled to and in communication with a controller 170 of the core engine 180. The controller 170 calls the trading partner agreement database 110 and the trading partner agreement database 110 receives the sender's identification information 104 and the receiver's identification information 105 of the outgoing message as shown in step 202 of the flow diagram of FIG. 2A for generating an outgoing message.

Figure 2A:
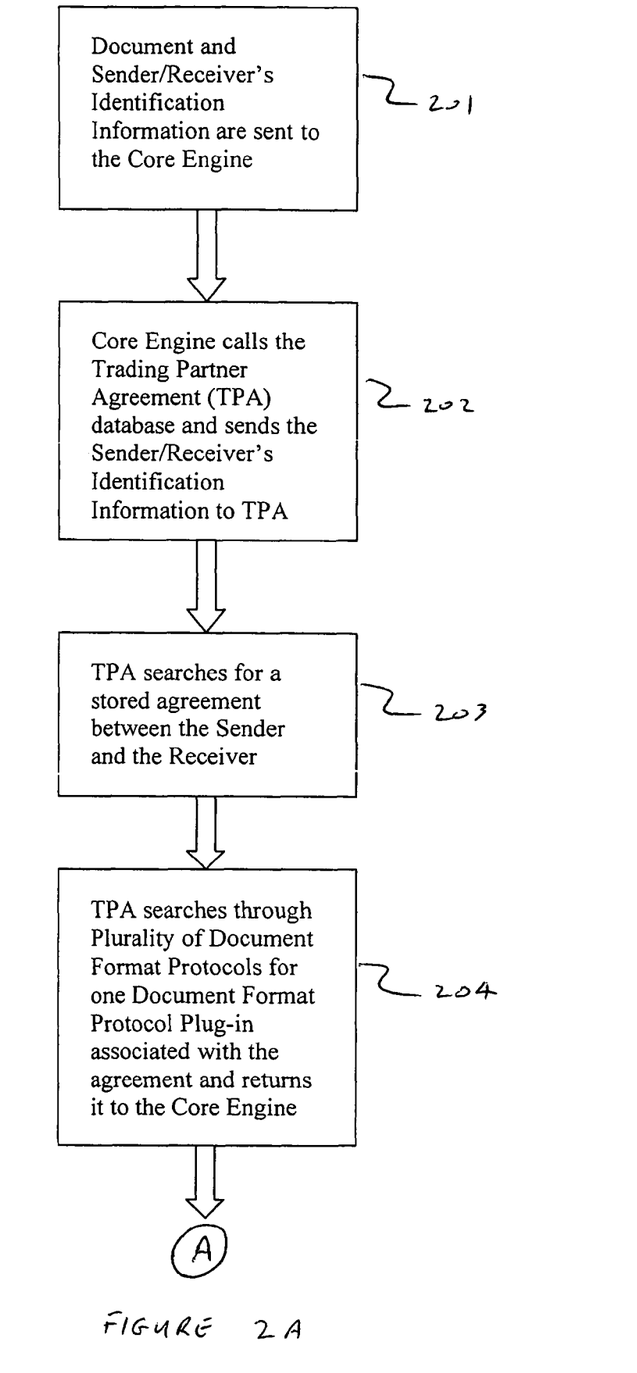
FIGS. 2A, 2B, and 2C show a flow diagram of a computer implemented process for generating an outgoing message according with one embodiment of the present invention.

Referring still to FIG. 1, the trading partner agreement database 110 searches its database for a stored agreement between the sender and the receiver as shown in step 203 of the flow diagram of FIG. 2A for generating an outgoing message. Referring still to FIG. 1, the determination of the agreement is based on the sender's identification information 104 and the receiver's identification information 105. The stored agreement indicates the agreed upon extensible document format protocol plug-in 123 and the agreed upon extensible exchange protocol plug-in 124 to be used during the transaction between the parties.

Trading partner agreement database 110 is coupled to plug-ins 120. Upon determination of the agreement between the parties to the transaction, the trading partner agreement database 110 sends signal 111, invoking the plurality of document format protocol plug-ins 125 for the outgoing message, in order to identify one particular document format protocol plug-in 123 associated with the agreement. As a result of sending signal 111, the trading partner agreement database 110 calls the plurality of extensible document format protocol plug-ins 125 in the plug-ins 120 and searches through plurality of document format protocols 125 for one particular document protocol plug-in 123 associated with the agreement as shown in step 204 of the flow diagram of FIG. 2A for generating an outgoing message. As a result, the agreed upon extensible document format protocol plug-in 123 is retrieved.

Figure 2B:
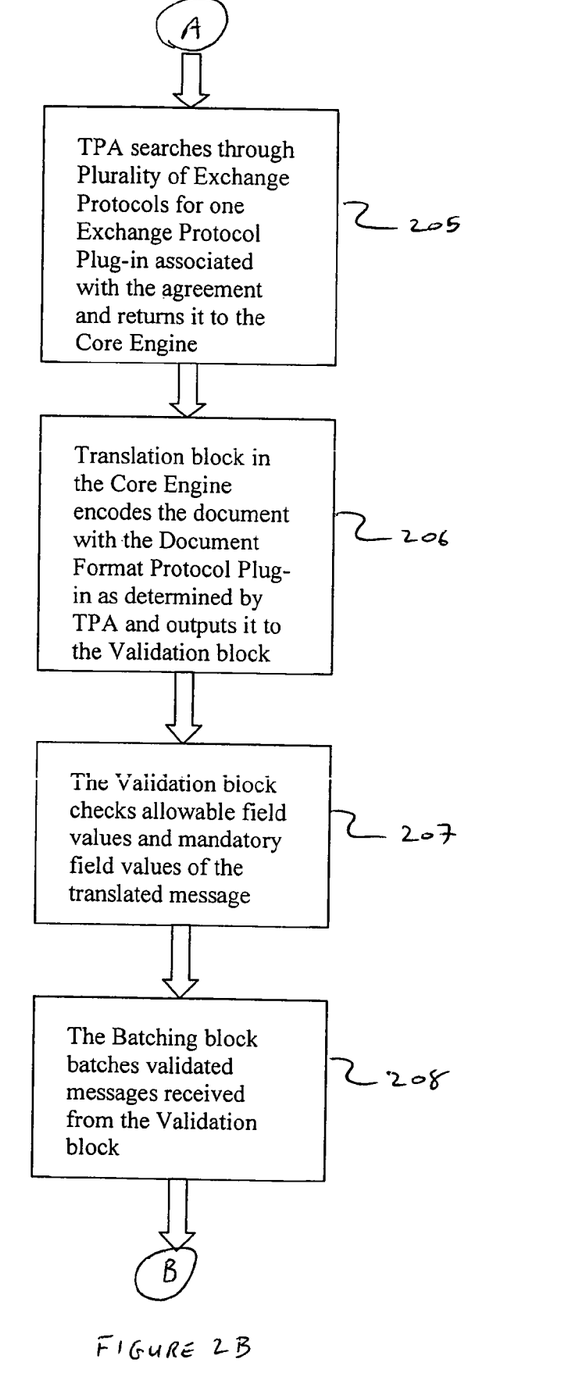

Referring still to FIG. 1, trading partner agreement database 110 is coupled to plug-ins 120. Upon determination of the agreement between the parties to the transaction, the trading partner agreement database 110 sends signal 112, invoking the plurality of exchange protocol plug-ins 126 for the outgoing message, in order to identify one particular exchange protocol plug-in 124 associated with the agreement. As a result of sending signal 112, the trading partner agreement database 110 calls the plurality of extensible exchange protocol plug-ins 126 in the plug-ins 120 and searches through plurality of exchange protocols 126 for one particular exchange protocol plug-in 124 associated with the agreement as shown in step 205 of the flow diagram of FIG. 2B for generating an outgoing message. As a result, the agreed upon extensible exchange protocol plug-in 124 is also retrieved.

Referring again to FIG. 1, the retrieved extensible document format protocol plug-in 123 and the retrieved extensible exchange protocol plug-in 124 are used by the core engine 180 to generate the outgoing message during a transaction.

Figure 2C:
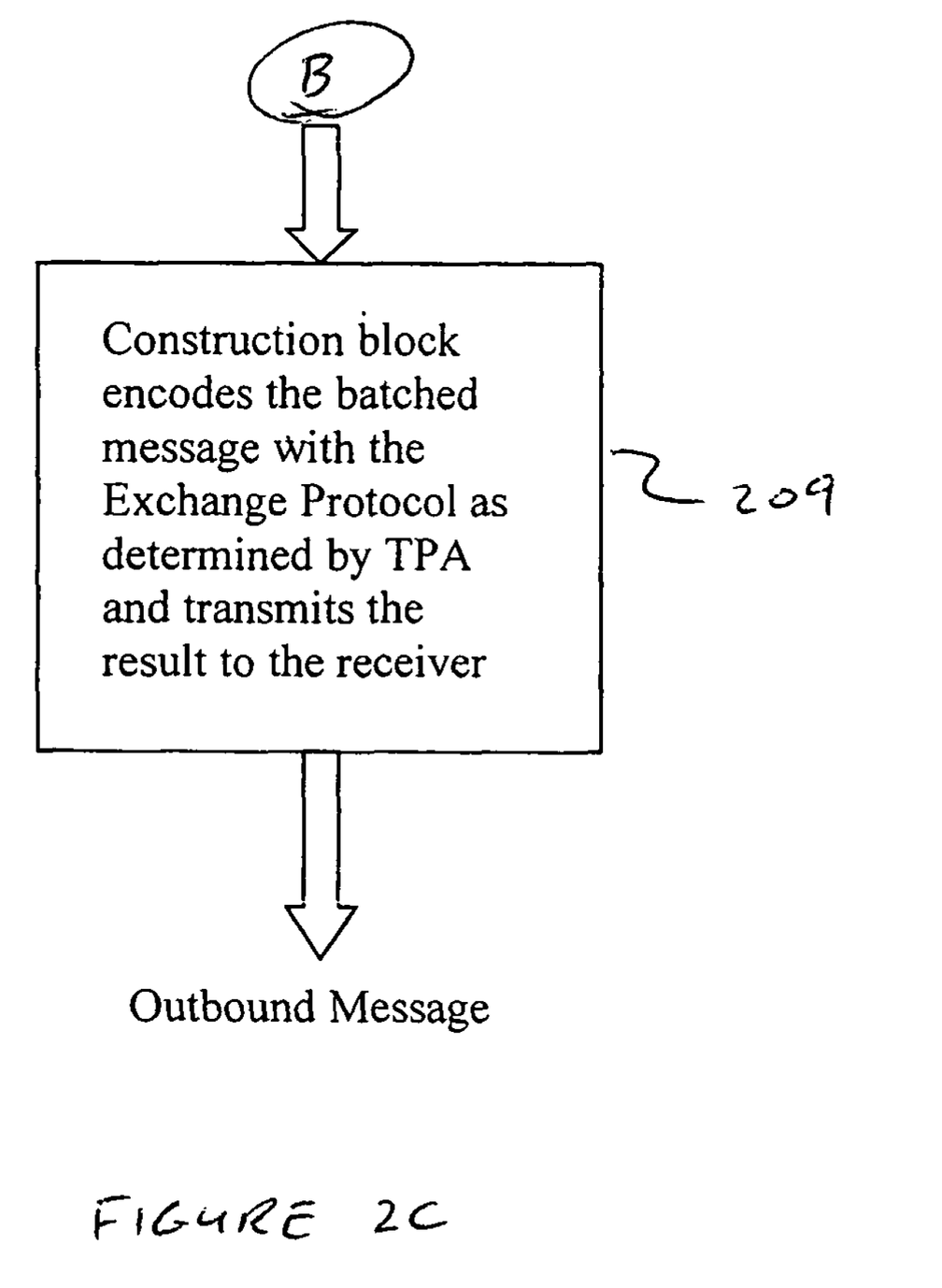

Plug-ins 120 is coupled to the core engine 180 and returns the extensible document format protocol plug-in 123 to the core engine 180 through its interface 121 as shown in step 204 of the flow diagram of FIG. 2 for generating an outgoing message. Referring once again to FIG. 1, plug-ins 120 returns the extensible exchange protocol plug-in 124 to the core engine 180 through its interface 122 as shown in step 205 of the flow diagram of FIG. 2 for generating an outgoing message. Interface 121 is a universal communication interface and is able to communicate with each plug-in 125 while providing a universal communication standard when communicating with the core engine 180. The same is true for communication interface 122 with respect to plug-ins 126. The interfaces mentioned provide the same communication language to all plug-ins 120, thereby facilitating communication between plug-ins 120 in addition to facilitating communication between plug-ins 120 and the core engine 180. The interfaces discussed are expandable to provide a universal communication interface between the core engine 180 and other plug-ins that may be developed and added in the future. The expandability of the interfaces to include other plug-ins that may be developed and added is advantageous because future plug-ins can simply be added without major alteration of the interface or then existing plug-ins. As a result, the interfaces mentioned save time, money and reduce complexity of the system for program developers.

Referring still to system 100, the core engine 180 is coupled to receive messages from the sender (applications 101, 102, and 103) in a native format such as the extensible markup language (XML). The core engine 180 receives the document 106 to be sent in its native format along with the extensible document format protocol plug-in 123 and the extensible exchange protocol plug-in 124 from the plug-ins 120. The core engine 180 translates the document 106 to be sent by using the extensible document format protocol plug-in 123. The core engine 180 constructs an outgoing message 161 by using the extensible exchange protocol plug-in 124. The core engine 180 comprises a translation block 130, a validation block 140, a batching block 150, a construction block 160, and a controller 170. Even though the core engine 180 discussed comprises a translation block 130, a validation block 140, a batching block 150, a construction block 160, and a controller 170, it is understood that the core engine 180 is not limited to these functional blocks and it may include additional functional blocks.

The translation block 130 receives the document 106 to be sent as well as the extensible document format protocol plug-in 123 from the plug-ins 120. The translation block 130 translates the document 106 by encoding it with the extensible document format protocol plug-in 123 as determined by the trading partner agreement database 110 and as shown in step 206 of the flow diagram of FIG. 2B for generating an outgoing message.

Referring still to FIG. 1, the translation block 130 outputs the translated message 131 to the validation block 140. The validation block 140 also receives the extensible document format protocol plug-in 123 and checks the allowable field values and the mandatory field values of the translated message 131 as shown in step 207 of the flow diagram of FIG. 2B for generating an outgoing message, thereby validating the translated message.

Referring still to FIG. 1, the validation block 140 outputs the validated message 141 to the optional batching block 150. The batching block 150 batches validated messages and outputs the batched message 151 to the construction block 160 as shown in step 208 of the flow diagram of FIG. 2B for generating an outgoing message. If batching operations are not required, then block 150 can be bypassed.

Referring again to FIG. 1, another input to the construction block 160 is the extensible exchange protocol plug-in 124. The construction block 160 encodes the batched message 151 with the extensible exchange protocol plug-in 124 as determined by the trading partner agreement database 110, in order to construct the outgoing message 161. Thereafter the outgoing message 161 is transmitted e.g., over any well-known communication medium, such as the Internet for example. Constructing the outgoing message 161 by encoding the batched message 151 with the extensible exchange protocol plug-in 124 and transmitting the outgoing message 161 is shown in step 209 of the flow diagram of FIG. 2C for generating an outgoing message.

It is appreciated that document protocol plug-ins 125 may support a plurality of different document standards, such as: EDI; EDI X12; EDI EDIFECS; HL7, to illustrate just a few. Any of a number of well-known e-commerce industry standard document protocols may be supported. Also, exchange protocol plug-ins 126 may support a number of different industry standard communication protocols that may offer secure communication mechanisms. Any of a number of well-known exchange protocols may be supported. Typically the exchange protocols offer communication mechanisms that provide for message authentication, message security and guaranteed delivery.

It is appreciated that by using the communication architecture shown in FIG. 1, embodiments of the present invention allows a message to be sent by mixing any supported document protocol with any supported exchange protocol. This flexibility allows trading partners to freely communicate using a protocol, or mix of protocols, that are supported. The system allows newly developed exchange and/or document protocols to be readily added with the system by adding to the universal interface 121 and 122. Therefore, the system is not only advantageous for providing flexibility to mix protocols depending on particular needs of the parties to the transaction, but it is also advantageous to the programmers as mentioned before. It is further appreciated that the described plug-ins may be implemented as software plug-in modules.

Figure 3:
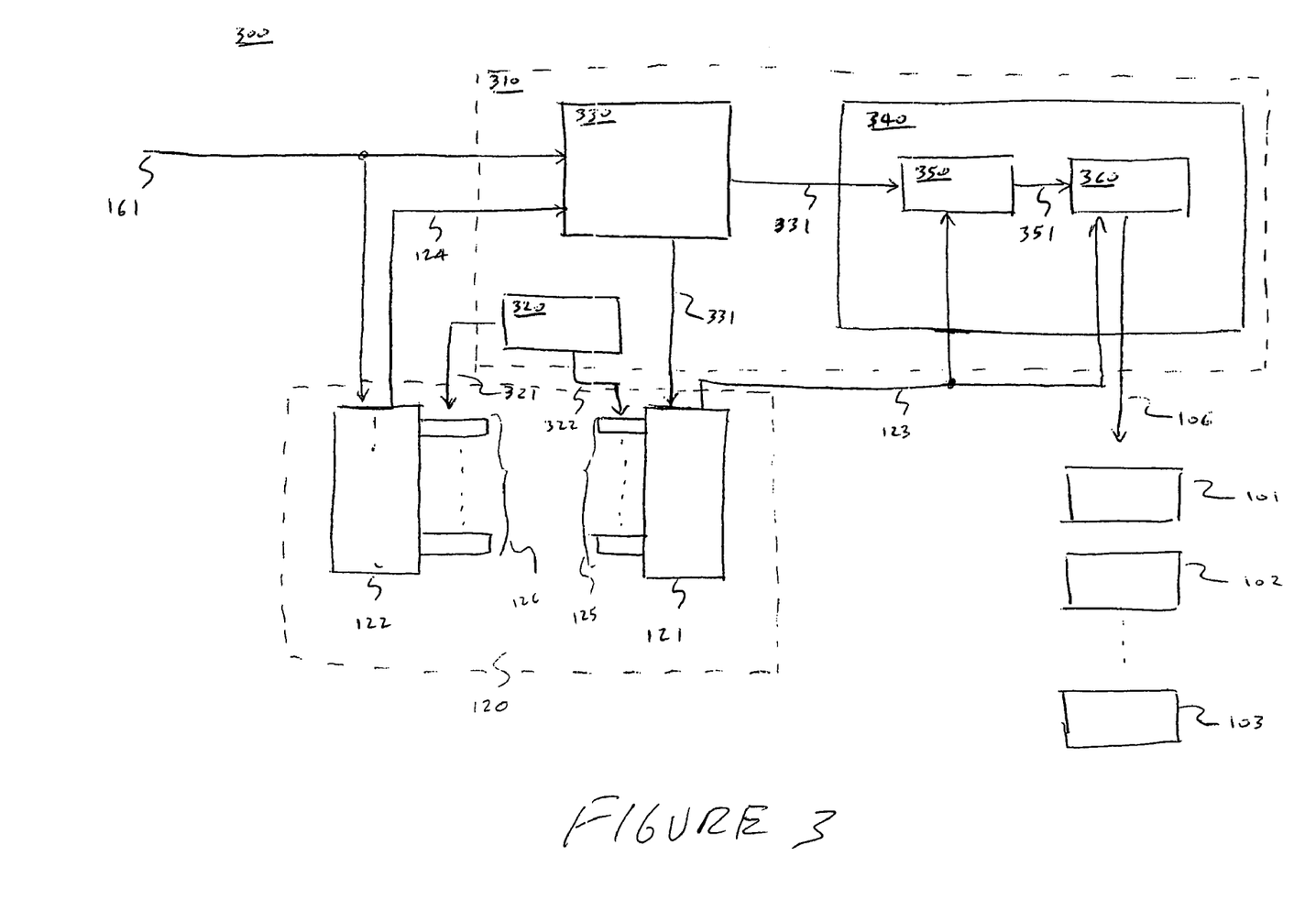
FIG. 3 shows one system embodiment of the present invention for translating a received message.
Figure 4A:
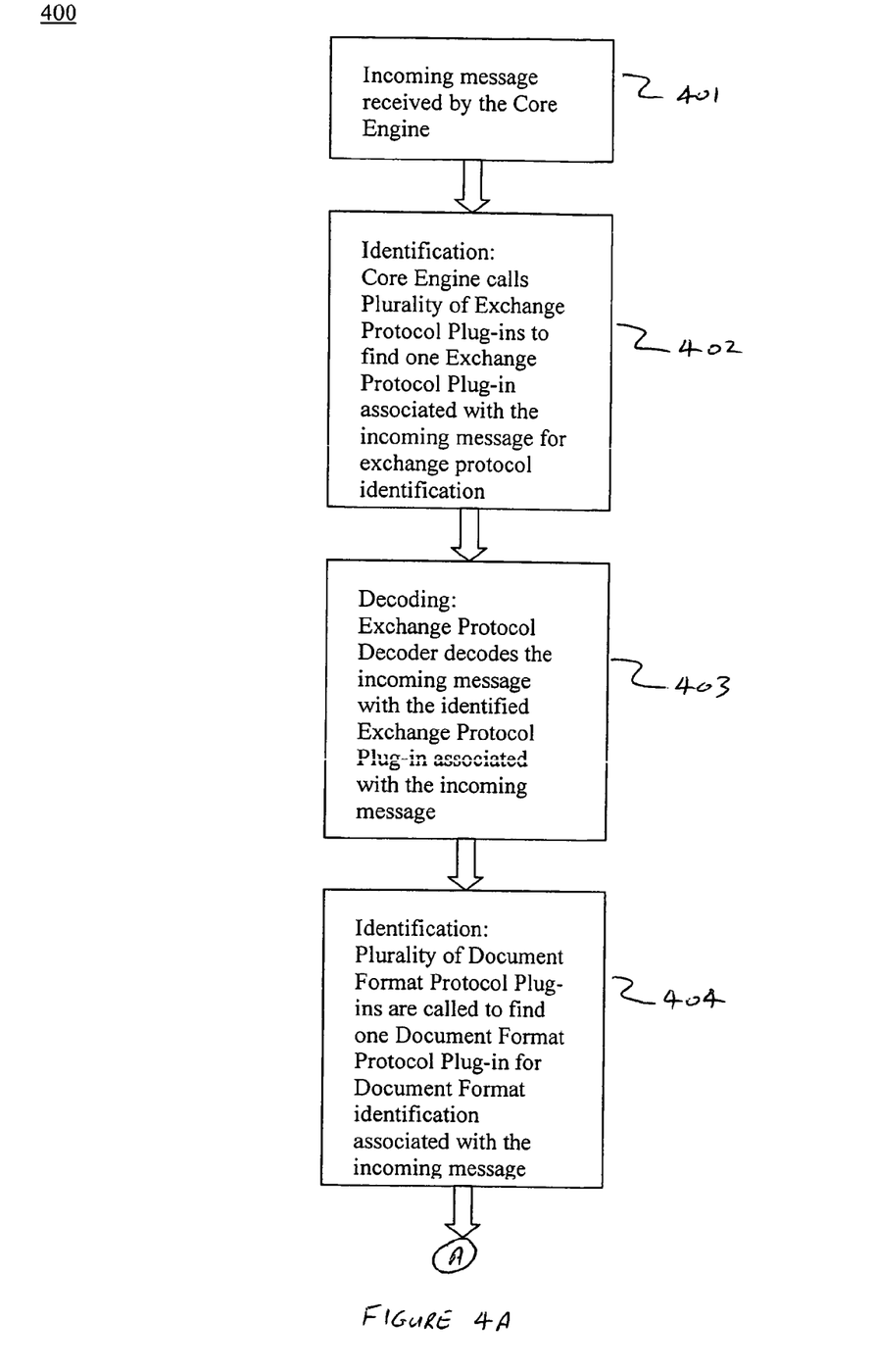
FIGS. 4A and 4B show a flow diagram of a computer implemented process for translating a received message according with one embodiment of the present invention.

Referring now to FIG. 3, an overview diagram of system 300 for translating an incoming message in accordance with one embodiment of the present invention is shown. In one embodiment, system 300 and its core engine 310 may be used to receive the outbound message generated and described in FIG. 1 as its incoming message 161 as shown in step 401 of a flow diagram of FIG. 4A for translating a received message. Generally, system 300 may be used to receive any inbound message. Referring still to FIG. 3, system 300 translates the incoming message 161 to its native format by calling the plurality of extensible exchange protocol plug-ins 126 and plurality of extensible document format protocol plug-ins 125 respectively. Upon receiving the inbound message, the core engine 310 causes each of the exchange protocol plug-ins 126 to attempt to identify the message, e.g., by examining the transport protocol code within the message. Generally, only one of the exchange protocol plug-ins will identify the message. The message is then decoded by the appropriate exchange plug-in. Once decoded, the plurality of document protocol plug-ins 125 are called to attempt to identify the document standard of the message. Generally, only one document protocol will identify the message and the message is then processed by that document protocol. As a result, system 300 finds the appropriate extensible exchange protocol plug-in 124 and the appropriate extensible document format protocol plug-in 123 respectively. Thereafter, system 300 decodes the incoming message 161 with the extensible exchange protocol plug-in 124 and processes the message with the extensible document format protocol plug-in 123.

More specifically, the plug-ins 120 are coupled to and in communication with a controller 320 of the core engine 310. The plug-ins 120 comprise of plurality of extensible exchange protocol plug-ins 126 and plurality of extensible document format protocol plug-ins 125. The plurality of extensible exchange protocol plug-ins 126 and the plurality of extensible document format protocol plug-ins 125 are coupled to their interfaces 122 and 121, respectively. The interface 122 is further coupled to the incoming message 161 and the core engine 310. The interface 121 is coupled to the core engine 310. As discussed above, the interfaces 121 and 122 provide a universal communication conduit between each plug-in and the core engine 310. As discussed before, the interfaces provide the same communication language to all plug-ins 120, thereby facilitating communication between plug-ins 120 in addition to facilitating communication between plug-ins 120 and the core engine 310. As mentioned the expandability of the interfaces is advantageous because future plug-ins can simply be added without major alteration to the interface or then existing plug-ins. Consequently, as discussed before the interfaces mentioned save time, money and reduce complexity of the system for program developers.

The incoming message 161 is received by the communication interface 122. The controller 320 sends signal 321, invoking the plurality of exchange protocol plug-ins 126 to process the inbound message 161, in order to identify the extensible exchange protocol plug-in 124 associated with the incoming message 161. Calling the plurality of exchange protocol plug-ins 126 causes the plurality of exchange protocol plug-ins 126 to be searched in order to find the extensible exchange protocol plug-in 124 associated with the incoming message 161 as shown in step 402 of the flow diagram of FIG. 4A for translating a received message.

Referring once again to FIG. 3, decoding block 330 of the core engine 310 receives the incoming message 161 and the extensible exchange protocol plug-in 124 that identified the incoming message 161 from the communication interface 122. The decoding block 330 decodes the incoming message 161 with the identified extensible exchange protocol plug-in 124 in order to generate decoded message 331 as shown in step 403 of the flow diagram of FIG. 4A for translating a received message.

Referring back to FIG. 3, the decoded message 331 is sent to the processing block 340 and to the interface 121, which is coupled to the plurality of extensible document format protocol plug-ins 125. The controller 320 sends signal 322, invoking the plurality of document format protocol plug-ins 125 in order to identify the extensible document format protocol plug-in 123 associated with the incoming message 161. Calling the plurality of document format protocol plug-ins 125 causes the plurality of extensible document format protocol plug-ins 125 to be searched in order to process the decoded message with the identified document format protocol plug-in 123 associated with the incoming message 161 as shown in step 404 of the flow diagram of FIG. 4A for translating a received message.

Figure 4B:
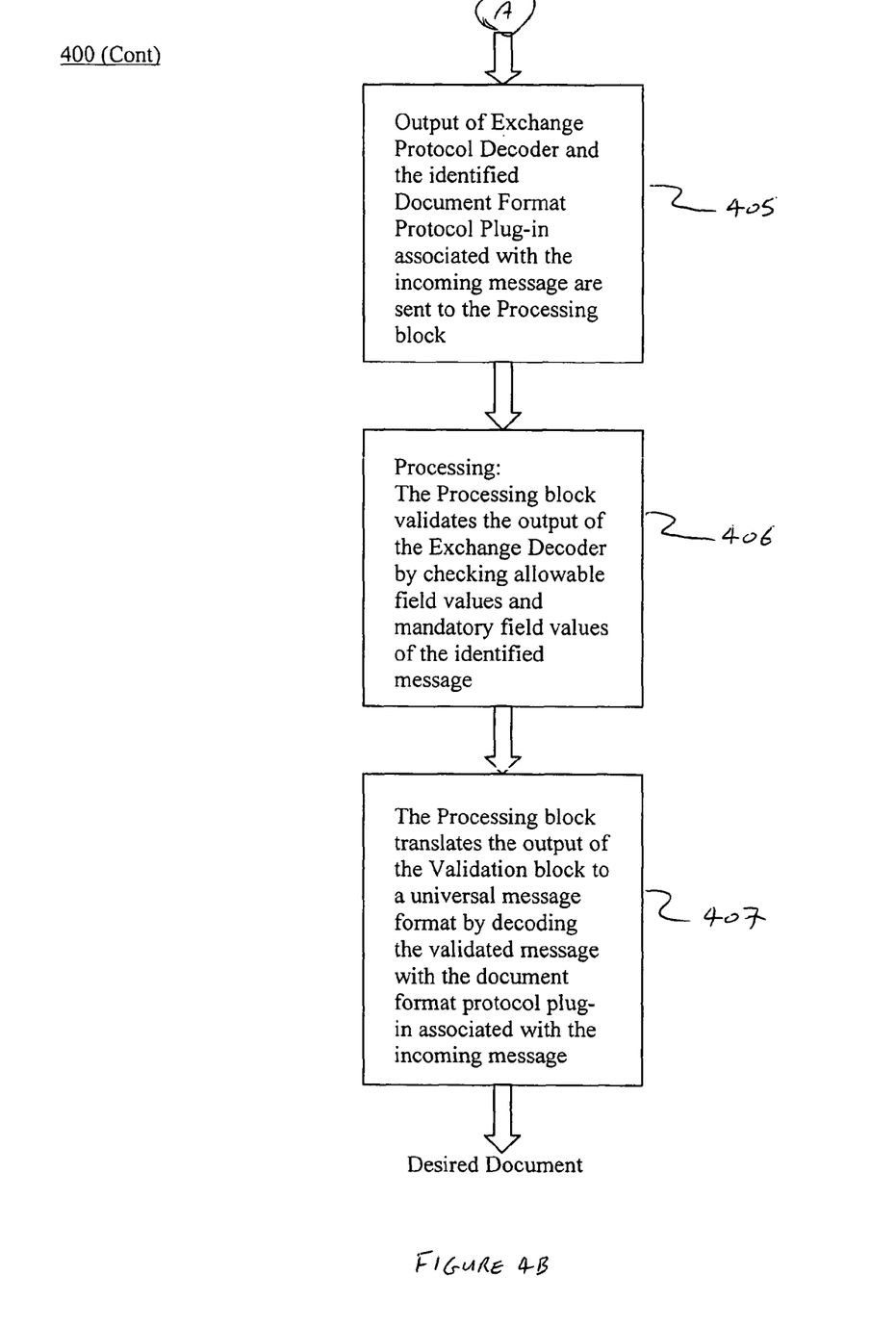

Referring still to FIG. 3, the processing block 340 comprises a validation block 350 and a translation block 360. The processing block 340 receives the identified document format protocol plug-in 123 and the decoded message 331 as shown in step 405 of the flow diagram of FIG. 4B for translating a received message.

Referring back to FIG. 3, a validation block 350 of the processing block 340 receives the decoded message 331 and the identified document format protocol plug-in 123 in order to validate the decoded message 331. The validation block 350 checks the allowable field values and the mandatory field values of the decoded message 331 based on the identified document protocol plug-in 123. As a result, it validates the decoded message 331 as shown in step 406 of the flow diagram of FIG. 4B for translating a received message.

Referring still to FIG. 3, the translation block 360 receives the validated message 351 and the identified document format protocol plug-in 123 in order to translate the validated message 351 into the document 106 in its native format. Translation is achieved by decoding the validated message 351 with the identified format protocol plug-in 123 associated with the incoming message 161 as shown in step 407 of the flow diagram of FIG. 4B. It is appreciated that message de-batching may also occur here. Referring once again to FIG. 3, the document 106 is outputted from the translation block 360 for consumption by applications 101, 102 and 103. The native language may be any format and in one example it is XML.

Advantageously, the system of FIG. 3 allows an incoming message to be decoded and processed using any pair of the supported exchange and document protocol plug-ins. This flexibility allows trading partners to select the document and exchange protocol that best suits the message with requiring any custom decoding software. As discussed above, plug-ins may be added for augmenting exchange and document standards. Therefore, the system is not only advantageous for providing flexibility to mix protocols depending on particular needs of the parties to the transaction, but it is also advantageous to program developers as discussed before.

It is appreciated that interfaces 121 and 122 provide a universal communication to talk with all documents for exchange and document protocol processing. All plug-ins therefore are written to communicate with this standard interface.

It is further appreciated that the described plug-ins may be implemented as software plug-in modules.

Figure 5:
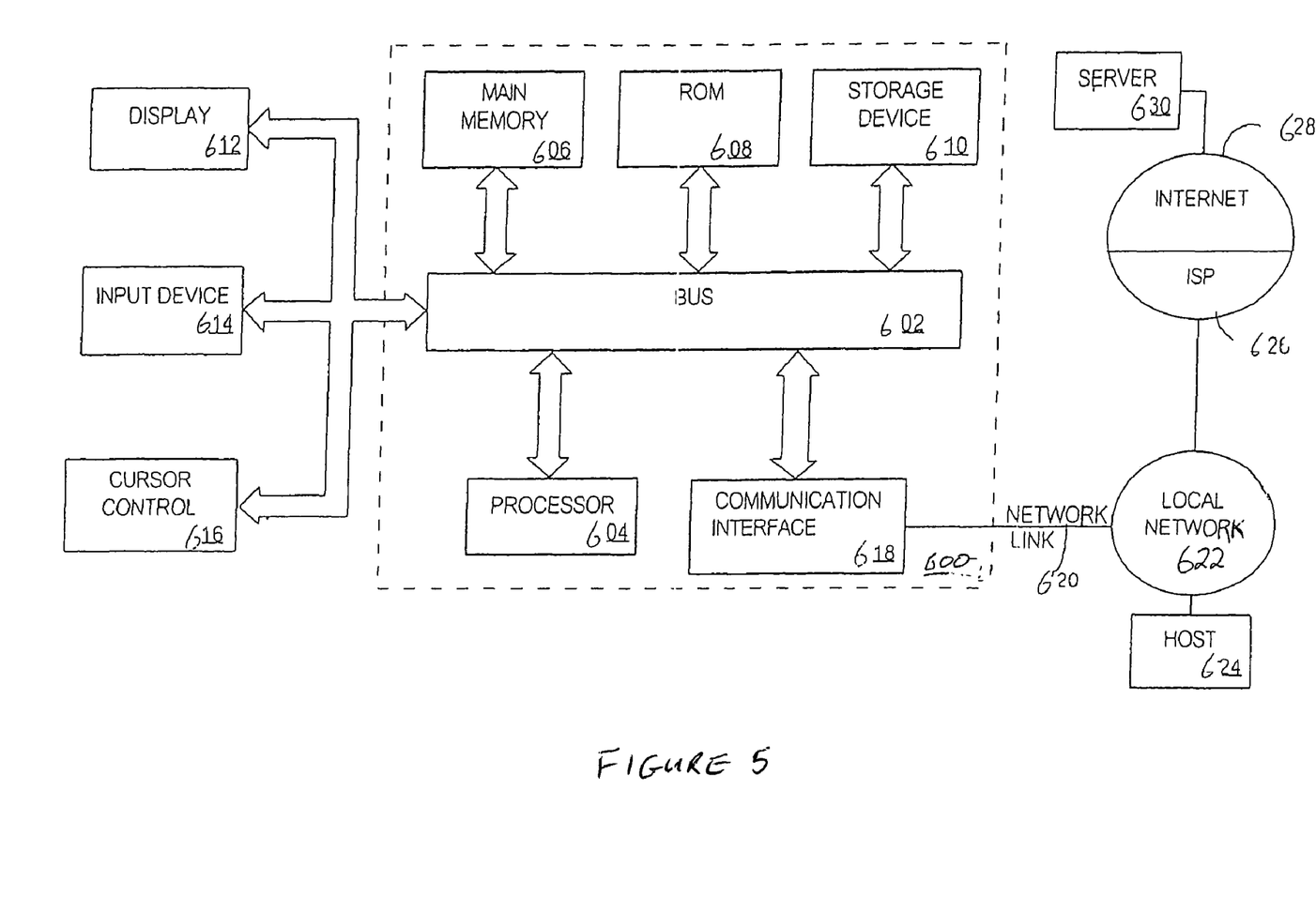
FIG. 5 illustrates a general purpose computer system that may serve as a platform for embodiments of the present invention.

FIG. 5 is a block diagram that illustrates a computer system 600 upon which an embodiment of the invention may be implemented. Computer system 600 may implement the software modules as shown in FIG. 1 and FIG. 3 and includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A non-volatile storage device 610, such as a magnetic disk or optical disk, is provided and coupled to bus 602 for storing information and instructions and may store the persistent internal queue.

Computer system 600 may be coupled via bus 602 to an optional display 612, such as a cathode ray tube (CRT), for displaying information to a computer user. An optional input device 614, including alphanumeric and other keys, may be coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612.

The invention is related to the use of computer system 600 for processing messages. According to one embodiment of the invention, messages are processed in response to processor 604 executing one or more sequences of one or more instructions contained in main memory 606 e.g., to implement processes 200 and 400. Such instructions may be read into main memory 606 from another computer readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of carrier waves transporting the information.

Computer system 600 can send and receive messages through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system for translating a received message, said system comprising:
    a first non-transitory computer-readable storage medium storing a plurality of extensible exchange protocol plug-ins for identifying and decoding an exchange protocol of said received message;
    a second non-transitory computer-readable storage medium storing a plurality of extensible document format protocol plug-ins for identifying and translating a document format protocol associated with said received message;
    a standard communication interface; and
    a processor coupled to said first and second non-transitory computer-readable storage media and said communication interface,
    said processor configured to:
        invoke each one of the plurality of extensible exchange protocol plug-ins to identify a particular exchange protocol associated with the received message;
        identify, by a particular one of said plurality of extensible exchange protocol plug-ins, the particular exchange protocol associated with the received message;
        upon successful identification of the particular exchange protocol, decode said received message with said particular one of the plurality of extensible exchange protocol plug-ins to produce a decoded message;
        invoke each one of the plurality of extensible document format protocol plug-ins to identify a particular document format protocol associated with the decoded message;
        identify, by a particular one of said plurality of extensible document format protocol plug-ins, the particular document format protocol associated with the decoded message; and
        upon successful identification of the particular document format protocol, translate said decoded message with said particular one of the plurality of extensible document format protocol plug-ins to produce an output message of a native format.

2. A system as described in claim 1, said processor further configured to validate said decoded message, based on said particular one of the plurality of extensible document format protocol plug-ins, to produce a validated message.

3. A system as described in claim 2 wherein said processor checks said decoded message for allowable field values and for mandatory fields.

4. A system as described in claim 2, said processor further configured to translate said validated message, based on said particular one of the plurality of extensible document format protocol plug-ins, into said message of said native format.

5. A system as described in claim 1 wherein said processor is configured to perform message de-batching.

6. A system as described in claim 1 wherein said native format is substantially compliant with XML syntax.

7. A system as described in claim 1 wherein said received message is encoded with an exchange protocol of one of said plurality of extensible exchange protocol plug-ins and is encoded with a document format protocol of one of said plurality of extensible document format protocol plug-ins.

8. A system as described in claim 1 wherein said standard communication interface is operable to function with additional extensible exchange protocol plug-ins and is further operable to function with additional extensible document format protocol plug-ins.

9. A computer-implemented method for translating an incoming message into a native format, comprising:
    invoking, by a processor, each of a plurality of extensible exchange protocol plug-ins to identify a particular exchange protocol associated with the incoming message;
    identifying, by a particular one of the plurality of extensible exchange protocol plug-ins, the particular exchange protocol associated with the incoming message
    upon a successful identification of the particular exchange protocol, decoding, using the processor, said incoming message with said particular one of the plurality of extensible exchange protocol plug-ins to produce a decoded message;
    invoking, by the processor, each one of a plurality of extensible document format protocol plug-ins to identify a particular document format protocol associated with the decoded message;
    identifying, by a particular one of said plurality of extensible document format protocol plug-ins, the particular document format protocol associated with the decoded message;
    upon a successful identification of the particular document format protocol, translating, using the processor, said decoded message with said particular one of the plurality of extensible document format protocol plug-ins to produce an output message of said native format.

10. A method as described in claim 9 further comprising: validating said decoded message based on said particular one of the plurality of extensible document format protocol plug-ins, to produce a validated message.

11. A method as described in claim 10, further comprising: translating said validated message, based on said particular one of the plurality of extensible document format protocol plug-ins, into said native format.

12. A method as described in claim 9 wherein said native format is substantially compliant with the extensible markup language (XML) format.

13. A method as described in claim 9 further comprising: checking said decoded message for allowable field values and for mandatory fields.

14. A method as described in claim 9 further comprising de-batching a plurality of incoming messages that includes said incoming message.

15. A method as described in claim 9 wherein said received message is encoded with an exchange protocol of one of said plurality of extensible exchange protocol plug-ins and is encoded with a document format protocol of one of said plurality of extensible document format protocol plug-ins.

16. A non-transitory computer-readable storage medium storing a plurality of instructions which, when executed by a processor, cause the processor to perform a method for translating an incoming message into a native format, said method comprising:
- invoking each of a plurality of extensible exchange protocol plug-ins to identify a particular exchange protocol associated with the incoming message;
- identifying, by a particular one of said plurality of extensible exchange protocol plug-ins, the particular exchange protocol associated with the incoming message;
- upon a successful identification of the particular exchange protocol, decoding said incoming message with said particular one of the plurality of extensible exchange protocol plug-ins to produce a decoded message;
- invoking each of a plurality of extensible document protocol plug-ins to identify a particular document format protocol associated with the decoded message;
- identifying, by a particular one of said plurality of extensible document protocol plug ins, the particular document format protocol associated with the decoded message;
- upon a successful identification of the particular document format protocol, translating said decoded message with said particular one of the plurality of extensible document format protocol plug-ins to produce an output message of said native format.

17. A non-transitory computer-readable storage medium as described in claim 16, said method further comprising:
validating said decoded message based on said particular one of the plurality of extensible document format protocol plug-ins, to produce a validated message.

18. A non-transitory computer-readable storage medium as described in claim 17, further comprising:
translating said validated message, based on said particular one of the plurality of extensible document format protocol plug-in, into said native format.

19. A non-transitory computer-readable storage medium as described in claim 16, wherein said native format is substantially compliant with the extensible markup language (XML) format.

20. A non-transitory computer-readable storage medium as described in claim 16, said method further comprising: checking said decoded message for allowable field values and for mandatory fields.

21. A non-transitory computer-implemented storage medium as described in claim 16, said method further comprising de-batching a plurality of incoming messages that includes said incoming message.

22. A non-transitory computer-readable storage medium as described in claim 16, wherein said received message is encoded with an exchange protocol of one of said plurality of extensible exchange protocol plug-ins and is encoded with a document format protocol of one of said plurality of extensible document format protocol plug-ins.

* * * * *

UNITED STATES PATENT AND TRADEMARK OFFICE
CERTIFICATE OF CORRECTION

| | | |
|---|---|---|
| PATENT NO. | : 7,900,208 B2 | Page 1 of 1 |
| APPLICATION NO. | : 11/291186 | |
| DATED | : March 1, 2011 | |
| INVENTOR(S) | : Shenbagam et al. | |

It is certified that error appears in the above-identified patent and that said Letters Patent is hereby corrected as shown below:

In column 12, line 28-29, in Claim 9, delete "message" and insert -- message; --, therefor.

In column 13, line 23, in Claim 16, delete "plug ins," and insert -- plug-ins, --, therefor.

Signed and Sealed this
Eleventh Day of October, 2011

David J. Kappos
*Director of the United States Patent and Trademark Office*